Patented Sept. 5, 1939

2,171,824

UNITED STATES PATENT OFFICE 2,171,824

AZO DYESTUFFS

Gérald Bonhôte and Hans Johner, Basel, Switzerland, assignors to the firm Society of Chemical Industry in Basle, Basel, Switzerland No Drawing. Application July 25, 1938, Serial No. 221,250. In Switzerland August 27, 1937

5 Claims. (Cl. 260—188)

It has been found that amines of the general formula

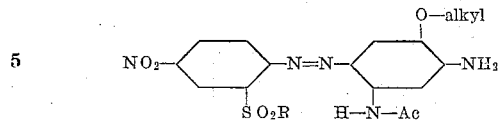

in which R stands for an alkyl, aralkyl or aryl radical and Ac stands for a substituted or nonsubstituted acyl radical such as

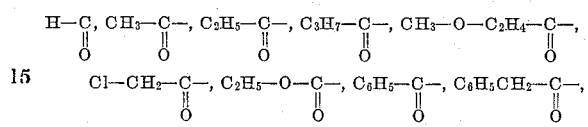

etc., are valuable starting materials for the manufacture of azo dyestuffs. Amines of this general formula are aminoazo-dyestuffs obtainable by coupling diazo-compounds such as those of 2-methyl- or 2-ethylsulfone-4-nitro-1-aminobenzene, 2-methylsulfone-4-nitro-6-chloro-1-aminobenzene with coupling components such as 2-ethoxy-5-acetylamino-1-aminobenzene, 2-ethoxy-5-butyrylamino-1-aminobenzene, 2-methoxy-5-acetylamino-1-aminobenzene, 2-methoxy-5-carbethoxyamino-1-aminobenzene or the like.

When diazotized and coupled with any one of various coupling components, the aminoazo-compounds of the above mentioned general formula produce dyestuffs which are characterized by their depth of tint and their properties of fastness. If sulfonated coupling components are used there are obtained wool or cotton dyestuffs depending on the components selected. If nonsulfonated coupling components are used, especially arylides of 2:3-hydroxynaphthoic acid, lacquer or pigment dyestuffs are obtained which, when produced on suitable supports, for instance cellulose, color the supports very valuable blue to green-blue tints.

The new dyestuffs correspond therefore to the general formula

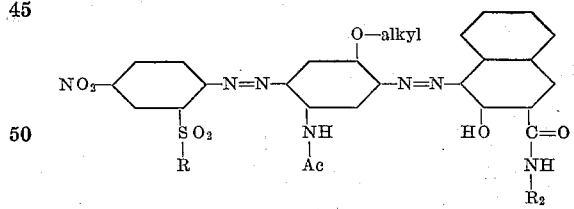

in which R and Ac have the signification indicated above and $R_2$ stands for a cyclic radical selected from the group consisting of the benzene and naphthalene series.

The following examples illustrate the invention, the parts being by weight:

Example 1

40.5 parts of 4-amino-5-methoxy-2-acetylamino-2'-methylsulfone-4'-nitro-1:1'-azobenzene are diazotized as usual and the mixture is introduced into a solution of 26.3 parts of 2:3-hydroxynaphthoic acid anilide, 40 parts of sodium hydroxide solution of 30 per cent strength, 15 parts of anhydrous sodium carbonate and 100 parts of water. The dyestuff of the formula

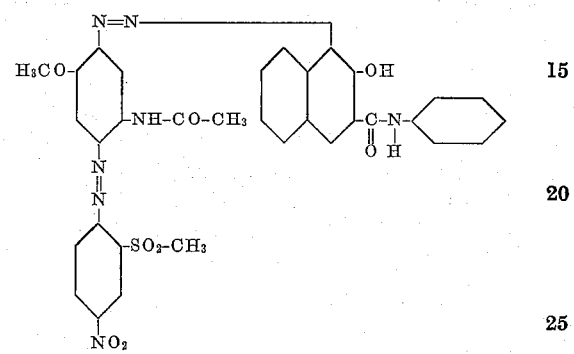

thus formed is immediately precipitated. The dark blue precipitate is filtered and dried.

The new dyestuff may be used for the manufacture of soluble dyestuff derivatives, for example by esterifying it in the presence of pyridine with benzoic acid sulfochloride. A product is then obtained which, when printed on cotton, yields marine blue tints. Similar tints are obtained with aid of dyestuffs which are produced according to the data of the first paragraph of this example, for instance with dyestuffs of the formulas

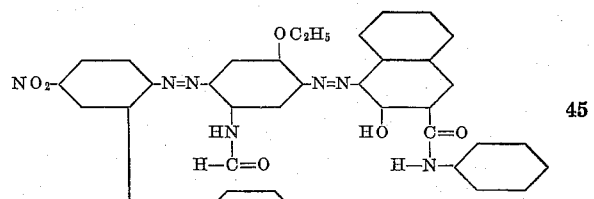

or

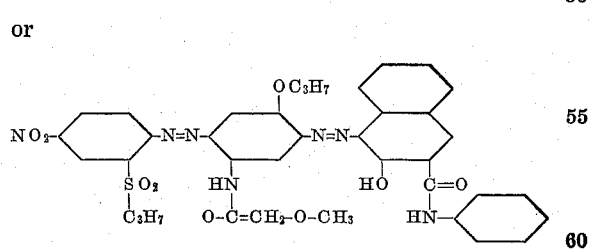

Example 2

Cotton yarn is impregnated with a solution of 7 grams of 2:3-hydroxynaphthoic acid-2'-methylanilide, 14 cc. of caustic soda solution of 36° Bé., 5 cc. of Turkey red oil and 5 cc. of formaldehyde solution of 40 per cent strength per liter; the goods are then well wrung out and developed in a diazo-solution buffered with sodium acetate and corresponding with 2 grams of 4-amino- 5 -methoxy- 2 -acetylamino-2'-methylfone-4'-nitro-1:1'-azobenzene per liter. There is produced a pure dark blue tint of very good properties of fastness. The new dyestuff corresponds to the formula

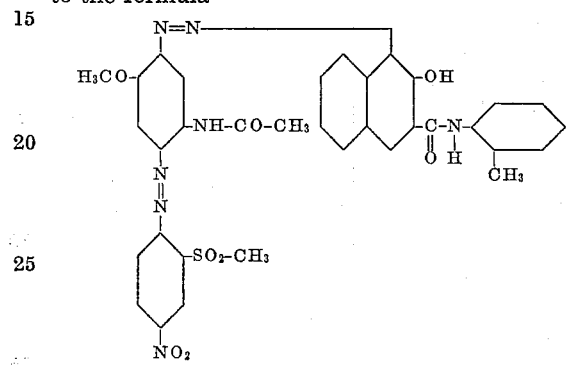

Similar tints are obtained with other arylides of 2:3-hydroxy-naphthoic acid, for instance the meta-toluidide, the para-toluidide, the para-chloranilide, the para-anisidide, the meta-nitranilide, the α-naphthylamide, the β-naphthylamide, the meta-chloranilide, the 4-chloro-2-toluidide, the ortho-phenetidide, the para-phenetidide, the 2-methyl-4-methoxyanilide, the 2:5-dimethoxy-4-chloranilide of 2:3-hydroxynaphthoic acid.

Similar tints are further obtained by coupling the coupling components named in this example with diazotized aminoazo-dyestuffs such as

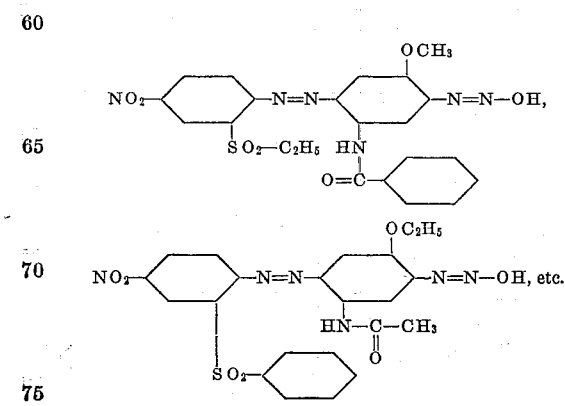

Such dyestuffs are for example dyestuffs of the formulas

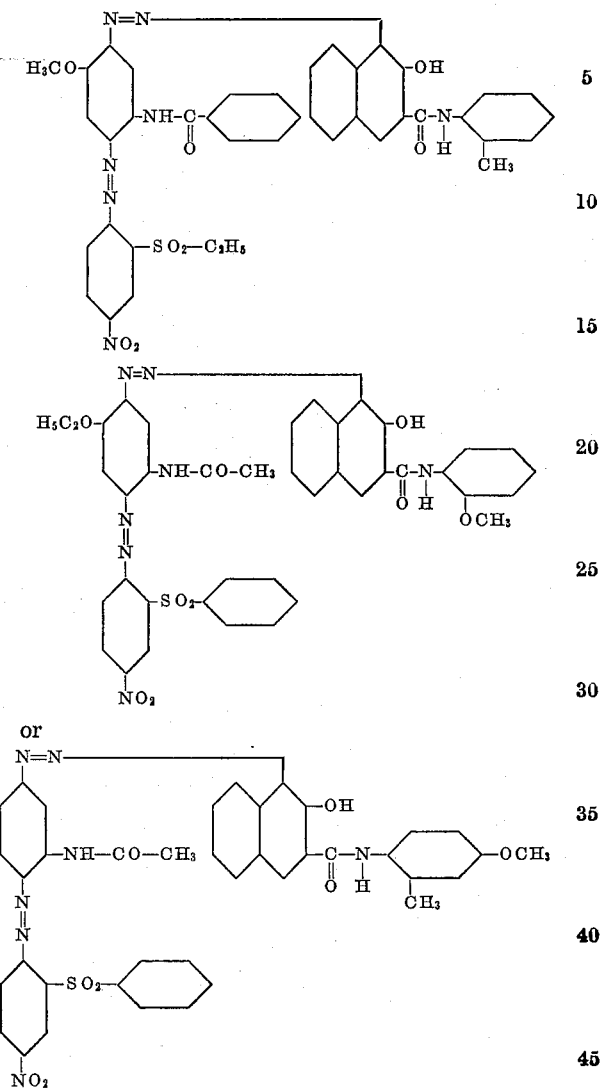

Example 3

Cotton yarn is impregnated with a solution of 7 grams of 2:3-hydroxynaphthoic acid-2'-methoxyanilide, 14 cc. of caustic soda solution of 36° Bé., 5 cc. of Turkey red oil and 5 cc. of formaldehyde solution of 40 per cent strength, per liter; the goods are well wrung out and developed in a diazo-solution buffered with sodium acetate and corresponding with 2 grams of 4-amino-5-methoxy-2-acetylamino - 2'- methylsulfone-4'-nitro-1:1'-azobenzene per liter. There is produced a deep navy blue tint of very good properties of fastness. The new dyestuff corresponds to the formula

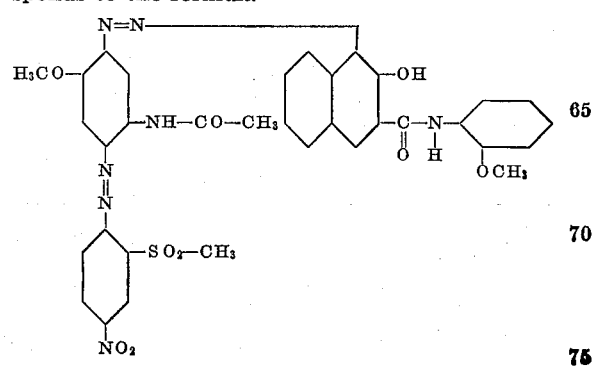

Similar results are obtained on the piece and in printing.

What we claim is:

1. The azo dyestuffs of the general formula

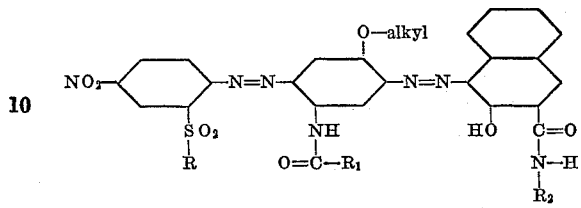

in which R stands for a member of the group consisting of alkyl radicals, aralkyl radicals and aryl radicals of the benzene series, R₁ stands for a member of the group consisting of alkyl radicals, O-alkyl radicals, aralkyl radicals, and aryl radicals of the benzene series, and R₂ stands for an aromatic nucleus of the group consisting of aromatic nuclei of the benzene and naphthalene series.

2. The azo dyestuffs of the general formula

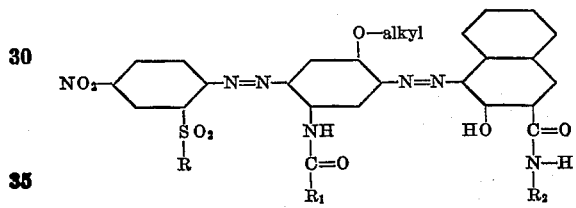

in which R and R₁ stand for alkyl radicals and R₂ stands for an aromatic nucleus of the group consisting of aromatic nuclei of the benzene and naphthalene series.

3. The azo dyestuff of the formula

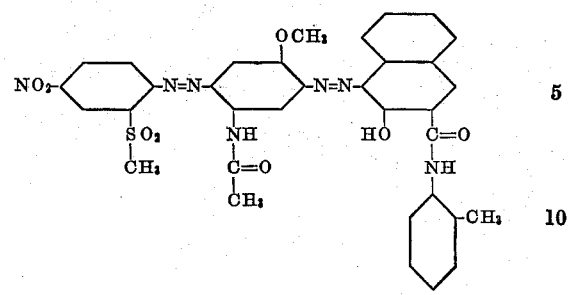

4. The azo dyestuff of the formula

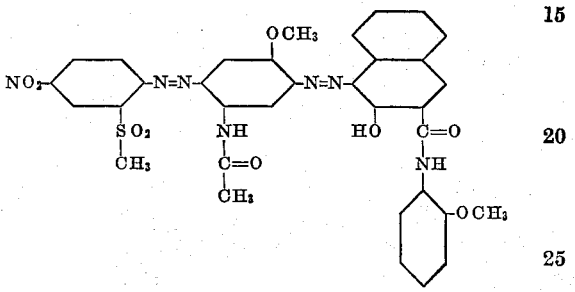

5. The azo dyestuff of the formula

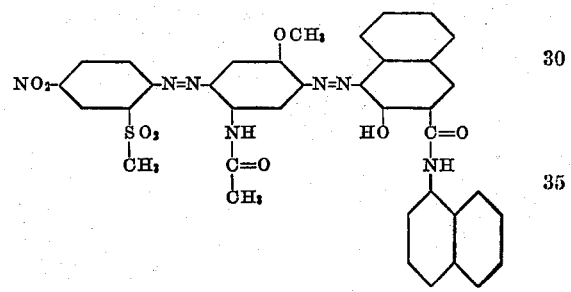

GÉRALD BONHÔTE.
HANS JOHNER.